United States Patent
Wu et al.

(10) Patent No.: US 12,101,791 B2
(45) Date of Patent: Sep. 24, 2024

(54) DEVICE INFORMATION IN A CONTEXT SETUP REQUEST

(71) Applicant: LENOVO (BEIJING) LIMITED, Beijing (CN)

(72) Inventors: Lianhai Wu, Beijing (CN); Joachim Lohr, Wiesbaden (DE); Prateek Basu Mallick, Dreieich (DE); Haiming Wang, Beijing (CN); Jing Han, Beijing (CN); Hongmei Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 691 days.

(21) Appl. No.: 17/276,403

(22) PCT Filed: Oct. 9, 2018

(86) PCT No.: PCT/CN2018/109497
§ 371 (c)(1),
(2) Date: Mar. 15, 2021

(87) PCT Pub. No.: WO2020/073197
PCT Pub. Date: Apr. 16, 2020

(65) Prior Publication Data
US 2022/0078674 A1  Mar. 10, 2022

(51) Int. Cl.
*H04W 4/00* (2018.01)
*H04W 36/00* (2009.01)
(Continued)

(52) U.S. Cl.
CPC ....... *H04W 72/29* (2023.01); *H04W 36/0055* (2013.01); *H04W 36/08* (2013.01);
(Continued)

(58) Field of Classification Search
CPC . H04W 36/0055; H04W 36/08; H04W 36/00; H04W 36/26
(Continued)

(56) References Cited

U.S. PATENT DOCUMENTS 11,653,248 B2 *  5/2023  Na ................... H04W 28/0257
                                                    370/329
11,695,731 B2 *  7/2023  Sengupta ............... H04L 67/63
                                                    726/11
(Continued)

FOREIGN PATENT DOCUMENTS

| CN | 104219656 A | 12/2014 | |
| CN | 108541032 A | 9/2018 | |
| WO | WO-2012061967 A1 * | 5/2012 | ........ H04W 36/0005 |

OTHER PUBLICATIONS

3GPP, 3rd Generation Partnership Project; Technical Specification Group Radio Access Network; NG-RAN; F1 application protocol (F1AP) (Release 15), 3GPP TS 38.473 V15.3.0, Sep. 2018, pp. 1-176.
(Continued)

*Primary Examiner* — Marceau Milord
(74) *Attorney, Agent, or Firm* — Kunzler Bean & Adamson

(57) ABSTRACT

Apparatuses, methods, and systems are disclosed for transmitting and/or receiving device information in a context setup request. One method (800) includes transmitting (802) a context setup request to a first device. The context setup request includes information corresponding to a second device. The method (800) includes receiving (804) a response to the context setup request.

14 Claims, 11 Drawing Sheets

(51) Int. Cl.
*H04W 36/08* (2009.01)
*H04W 36/26* (2009.01)
*H04W 72/29* (2023.01)
*H04W 76/11* (2018.01)
*H04W 76/27* (2018.01)
*H04W 76/34* (2018.01)

(52) U.S. Cl.
CPC ............ *H04W 36/26* (2013.01); *H04W 76/11* (2018.02); *H04W 76/27* (2018.02); *H04W 76/34* (2018.02)

(58) Field of Classification Search
USPC .......................................................... 370/329
See application file for complete search history.

(56) References Cited

U.S. PATENT DOCUMENTS

| | | | | |
|---|---|---|---|---|
| 2010/0260097 | A1* | 10/2010 | Ulupinar | H04W 40/36 370/315 |
| 2012/0052866 | A1* | 3/2012 | Froehlich | H04W 8/04 455/445 |
| 2012/0131184 | A1* | 5/2012 | Luna | H04L 67/567 709/224 |
| 2013/0266879 | A1* | 10/2013 | Ono | H01M 8/04225 429/429 |
| 2013/0286879 | A1* | 10/2013 | ElArabawy | H04N 21/26208 370/252 |
| 2013/0290492 | A1* | 10/2013 | ElArabawy | H04L 47/2416 709/219 |
| 2013/0298170 | A1* | 11/2013 | ElArabawy | H04L 47/2416 725/62 |
| 2014/0153392 | A1* | 6/2014 | Gell | H04W 28/0236 370/230 |
| 2014/0155043 | A1* | 6/2014 | Gell | H04L 67/02 455/414.1 |
| 2014/0198637 | A1 | 7/2014 | Shan et al. | |
| 2017/0013453 | A1* | 1/2017 | Lee | H04W 12/033 |
| 2017/0013454 | A1* | 1/2017 | Lee | H04L 63/06 |
| 2018/0270895 | A1 | 9/2018 | Park et al. | |
| 2019/0306848 | A1 | 10/2019 | Zhou et al. | |
| 2021/0204281 | A1 | 7/2021 | Wu et al. | |
| 2021/0211939 | A1 | 7/2021 | Teyeb et al. | |
| 2021/0227435 | A1 | 7/2021 | Hsieh | |
| 2021/0282050 | A1 | 9/2021 | Adjakple et al. | |
| 2022/0201777 | A1 | 6/2022 | Teyeb et al. | |

OTHER PUBLICATIONS

3GPP, 3rd Generation Partnership Project; Technical Specification Group Radio Access Network; NG-RAN; Architecture description (Release 15), 3GPP TS 38.401 V15.3.0, Sep. 2018, pp. 1-39.

3GPP, 3rd Generation Partnership Project; Technical Specification Group Radio Access Network; Study on Integrated Access and Backhaul; (Release 15), 3GPP TR 38.874 V0.5.0, Oct. 2018, pp. 1-78.

International Searching Authority, "Notification of Transmittal of the International Search Report and the Written Opinion of the International Searching Authority, or the Declaration", PCT/CN2018/109497, Oct. 9, 2018, pp. 1-6.

3GPP, 3rd Generation Partnership Project; Technical Specification Group Radio Access Network; Discussion on Inter-CU Topology Adaptation, 3GPP R3-185697 Oct. 2018, pp. 1-9.

U.S. Appl. No. 17/201,785, "Office Action Summary", USPTO, Aug. 9, 2023, pp. 1-22.

Chen et al., "QoS Assurance in IAB Network", 2020 International Wireless Communications and Mobile Computing (IWCMC), IEEE, Jul. 27, 2020, pp. 1-4.

U.S. Appl. No. 17/201,785, "Office Action Summary", USPTO, Apr. 1, 2024, pp. 1-15.

Ghosh et al., "5G Evolution: A View on 5G Cellular Technology Beyond 3GPP Release 15", IEEE, Sep. 2019, pp. 1-13.

* cited by examiner

DEVICE INFORMATION IN A CONTEXT SETUP REQUEST

FIELD

The subject matter disclosed herein relates generally to wireless communications and more particularly relates to device information in a context setup request.

BACKGROUND

The following abbreviations are herewith defined, at least some of which are referred to within the following description: Third Generation Partnership Project ("3GPP"), Acknowledge Mode ("AM"), Backhaul ("BH"), Broadcast Multicast ("BM"), Buffer Occupancy ("BO"), Base Station ("BS"), Bandwidth Part ("BWP"), Component Carrier ("CC"), Coordinated Multipoint ("CoMP"), Control Plane ("CP"), CSI-RS Resource Indicator ("CRI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Information Element ("M"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Prioritization ("LCP"), Long Term Evolution ("LTE"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), Packet Switched ("PS"), Primary Synchronization Signal ("PSS"), Quasi Co-Located ("QCL"), Quality of Service ("QoS"), Radio Access Network ("RAN"), Radio Access Technology ("RAT"), Resource Element ("RE"), Rank Indicator ("RI"), Radio Link Failure ("RLF"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Service Data Unit ("SDU"), Subscriber Identity Module ("SIM"), Signal-to-Interference and Noise Ratio ("SINR"), Sequence Number ("SN"), Synchronization Signal ("SS"), SS/PBCH Block ("SSB"), Secondary Synchronization Signal ("SSS"), Time Division Multiplexing ("TDM"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Voice Over IP ("VoIP"), Visited Public Land Mobile Network ("VPLMN"), and Worldwide Interoperability for Microwave Access to ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, context setup requests may be used. In such networks, a context setup request may supply limited information.

BRIEF SUMMARY

Methods for transmitting device information in a context setup request are disclosed. Apparatuses and systems also perform the functions of the apparatus. In one embodiment, the method includes transmitting a context setup request to a first device. In such an embodiment, the context setup request includes information corresponding to a second device. In certain embodiments, the method includes receiving a response to the context setup request.

An apparatus for transmitting device information in a context setup request, in one embodiment, includes a transmitter that transmits a context setup request to a first device. In such an embodiment, the context setup request includes information corresponding to a second device. In various embodiments, the apparatus includes a receiver that receives a response to the context setup request.

One method for receiving device information in a context setup request includes receiving a context setup request at a first device. In such an embodiment, the context setup request includes information corresponding to a second device. In some embodiments, the method includes transmitting a response to the context setup request.

An apparatus for receiving device information in a context setup request, in one embodiment, includes a receiver that receives a context setup request at a first device. In such an embodiment, the context setup request includes information corresponding to a second device. In various embodiments, the apparatus includes a transmitter that transmits a response to the context setup request.

One method for transmitting a message indicating to stop data transmissions includes transmitting a message including an indication to a third device to stop data transmissions corresponding to a second device. In certain embodiments, the method includes receiving a response to the message.

An apparatus for transmitting a message indicating to stop data transmissions, in one embodiment, includes a transmitter that transmits a message including an indication to a third device to stop data transmissions corresponding to a second device. In various embodiments, the apparatus includes a receiver that receives a response to the message.

One method for receiving a message indicating to stop data transmissions includes receiving a message including an indication at a third device to stop data transmissions corresponding to a second device. In some embodiments, the method includes transmitting a response to the message.

An apparatus for receiving a message indicating to stop data transmissions, in one embodiment, includes a receiver that receives a message including an indication at a third device to stop data transmissions corresponding to a second device. In various embodiments, the apparatus includes a transmitter that transmits a response to the message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
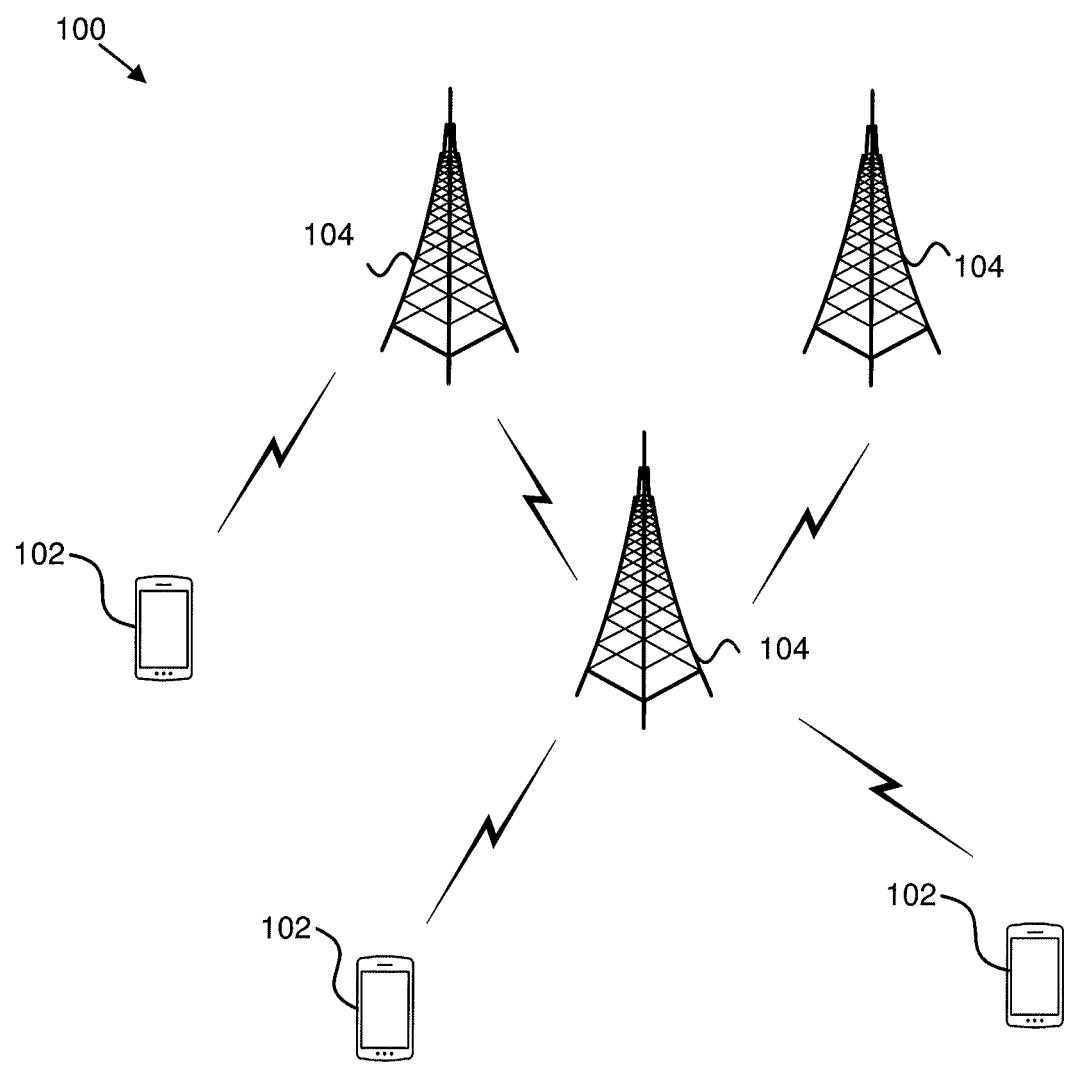
FIG. 1 is a schematic block diagram illustrating one embodiment of a wireless communication system for transmitting and/or receiving information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving information. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may transmit device information in a context setup request. In some embodiments, the network unit 104 may transmit a context setup request to a first device. In such embodiments, the context setup request includes information corresponding to a second device. In various embodiments, the network unit 104 may receive a response to the context setup request. Accordingly, a network unit 104 may be used for transmitting device information in a context setup request.

In certain embodiments, a network unit 104 may receive device information in a context setup request. In some embodiments, the network unit 104 may receive a context setup request at a first device. In such embodiments, the context setup request includes information corresponding to a second device. In various embodiments, the network unit 104 may transmit a response to the context setup request. Accordingly, a network unit 104 may be used for receiving device information in a context setup request.

In various embodiments, a network unit 104 may transmit a message indicating to stop data transmissions. In some embodiments, the network unit 104 may transmit a message including an indication to a third device to stop data transmissions corresponding to a second device. In various embodiments, the network unit 104 may receive a response to the message. Accordingly, a network unit 104 may be used for transmitting a message indicating to stop data transmissions.

In certain embodiments, a network unit 104 may receive a message indicating to stop data transmissions. In some embodiments, the network unit 104 may receive a message including an indication at a third device to stop data transmissions corresponding to a second device. In various embodiments, the network unit 104 may transmit a response to the message. Accordingly, a network unit 104 may be used for receiving a message indicating to stop data transmissions.

Figure 2:
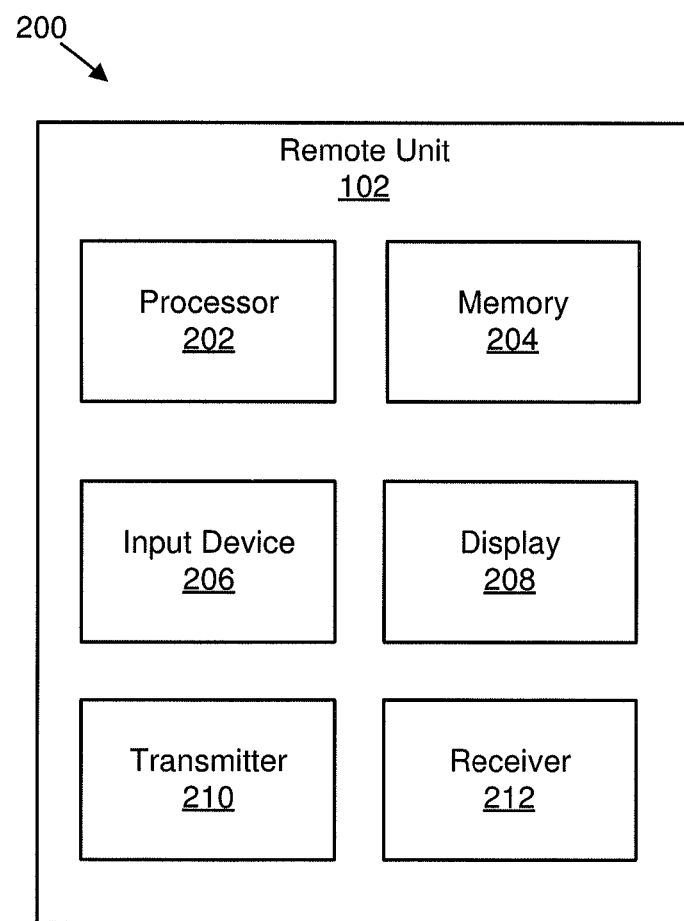
FIG. 2 is a schematic block diagram illustrating one embodiment of an apparatus that may be used for communication with a network.

FIG. 2 depicts one embodiment of an apparatus 200 that may be used for communication with a network. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
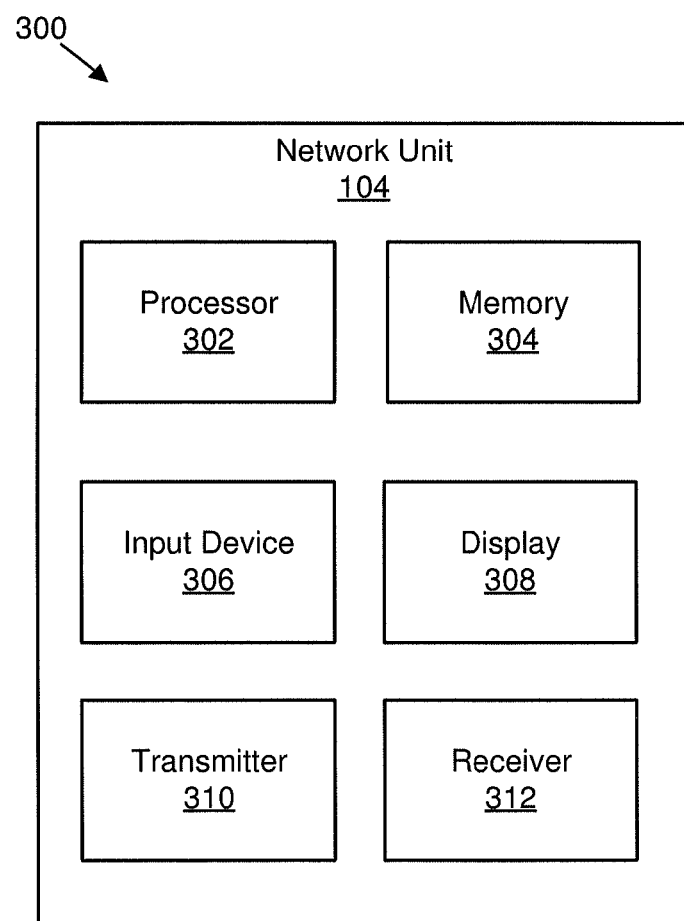
FIG. 3 is a schematic block diagram illustrating one embodiment of an apparatus that may be used for transmitting and/or receiving information.

FIG. 3 depicts one embodiment of an apparatus 300 that may be used for transmitting and/or receiving information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the transmitter 310 transmits a context setup request to a first device. In such an embodiment, the context setup request includes information corresponding to a second device. In various embodiments, the receiver 312 receives a response to the context setup request.

In another embodiment, the receiver 312 receives a context setup request at a first device. In such an embodiment, the context setup request includes information corresponding to a second device. In various embodiments, the transmitter 310 transmits a response to the context setup request.

In one embodiment, the transmitter 310 transmits a message including an indication to a third device to stop data transmissions corresponding to a second device. In various embodiments, the receiver 312 receives a response to the message.

In another embodiment, the receiver 312 receives a message including an indication at a third device to stop data transmissions corresponding to a second device. In various embodiments, the transmitter 310 transmits a response to the message.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
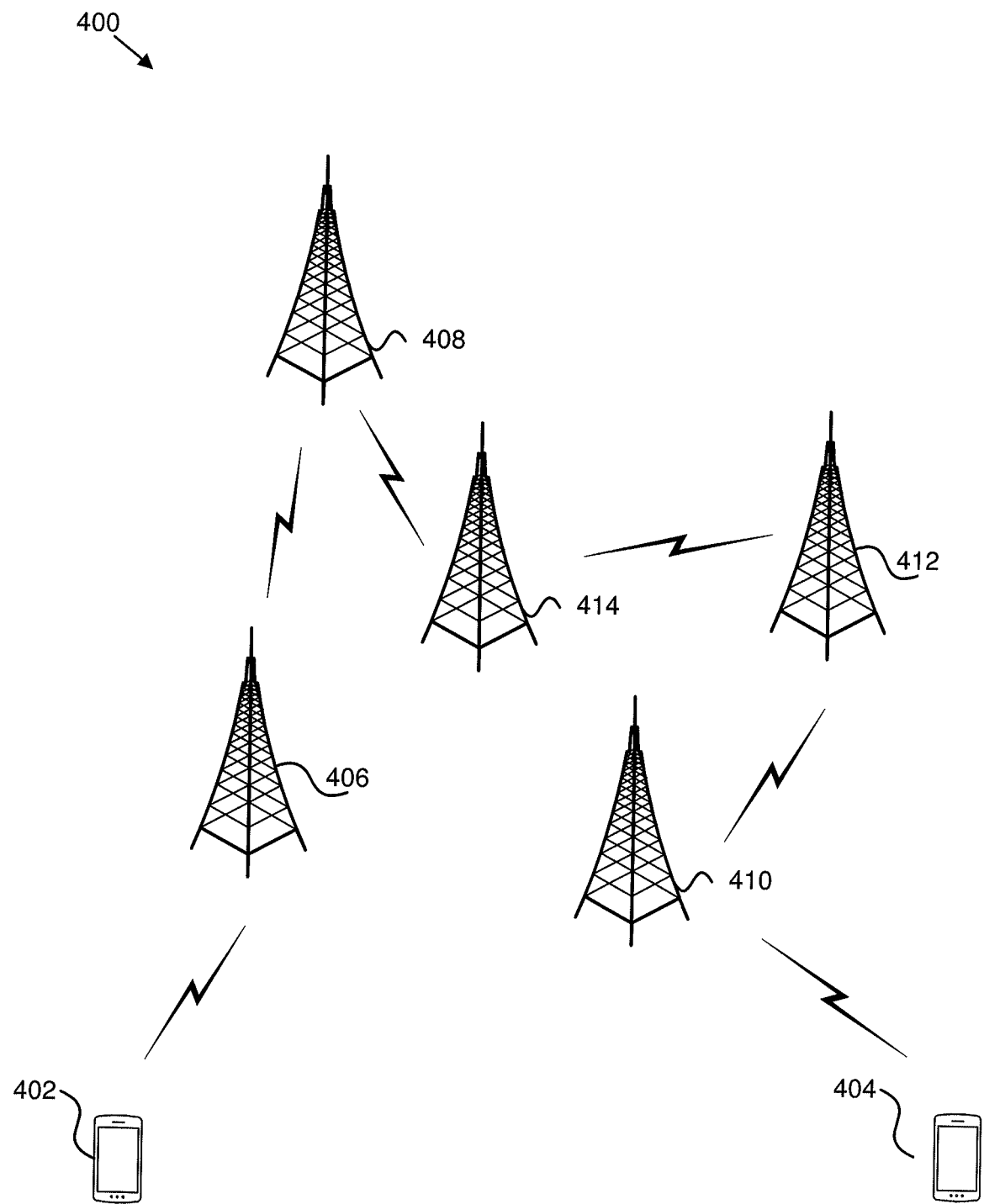
FIG. 4 is a schematic block diagram illustrating one embodiment of an integrated access backhaul system.

FIG. 4 is a schematic block diagram illustrating one embodiment of an integrated access backhaul ("IAB") system 400. The IAB system 400 includes a first UE 402, a second UE 404, a first IAB node 406, an IAB donor node 408, a second IAB node 410, a third IAB node 412, and a fourth IAB node 414. As illustrated, the first UE 402 is connected to the IAB donor node 408 via the first IAB node 406. Moreover, the second UE 404 is connected to the IAB donor node 408 via the second IAB node 410, the third IAB node 412, and the fourth IAB node 414. The IAB system 400, as illustrated, may be used for multi-hop backhauling via multiple IAB nodes.

As may be appreciated, multi-hop backhauling systems may provide a larger range extension than single hop systems. This may especially be beneficial for frequencies above 6 GHz due to a limited range of such frequencies. In some configurations, multi-hop backhauling enables backhauling around obstacles (e.g., buildings).

A maximum number of hops in a deployment may depend on many factors such as frequency, cell density, propagation environment, and traffic load. Thus, flexibility in hop count may be desirable. With an increased number of hops, scalability issues may arise, performance may be limited, and/or signaling load may increase signaling load to undesirable levels.

As may be appreciated, wireless backhaul links may be vulnerable to blockage (e.g., due to moving objects such as vehicles, due to seasonal changes (foliage), due to infrastructure changes (new buildings), and so forth). Such vulnerability may also apply to physically stationary IAB-nodes. In FIG. 4, the first UE 402 may switch from communicating via the first IAB node 406 to communicating with the second IAB node 410 if a backhaul link is blocked by objects (e.g., moving objects). Moreover, traffic variations may create uneven load distribution on wireless backhaul links leading to local link congestion and/or node congestion.

In some embodiments, an IAB node may include MT and DU functions. The MT function may be a component of a mobile equipment, or, as used herein, MT may be a function residing on an IAB node that terminates radio interface layers of a backhaul Uu interface toward the IAB-donor or other JAB nodes.

In various embodiments, a gNB may include a gNB-CU and one or more gNB-DUs. Moreover, a gNB-CU and a gNB-DU may be connected via an F1 interface. A gNB-CU may be a gNB central unit that is a logical node hosting RRC, SDAP, and PDCP protocols of the gNB. Furthermore, a gNB-DU may be a gNB distributed unit that is a logical node hosting RLC, MAC, and PHY layers of the gNB. In some embodiments, one cell is supported by only one gNB-DU.

In FIG. 4 the IAB nodes may be in a standalone mode which includes one IAB-donor and multiple IAB-nodes. The IAB-donor node 408 may be treated as a single logical node that includes a set of functions such as gNB-DU, gNB-CU-CP, gNB-CU-UP and potentially other functions. In certain embodiments, the JAB-donor node 408 may be split according to its functions which can all be either collocated or non-collocated as allowed by 3GPP NG-RAN architecture.

Figure 5:
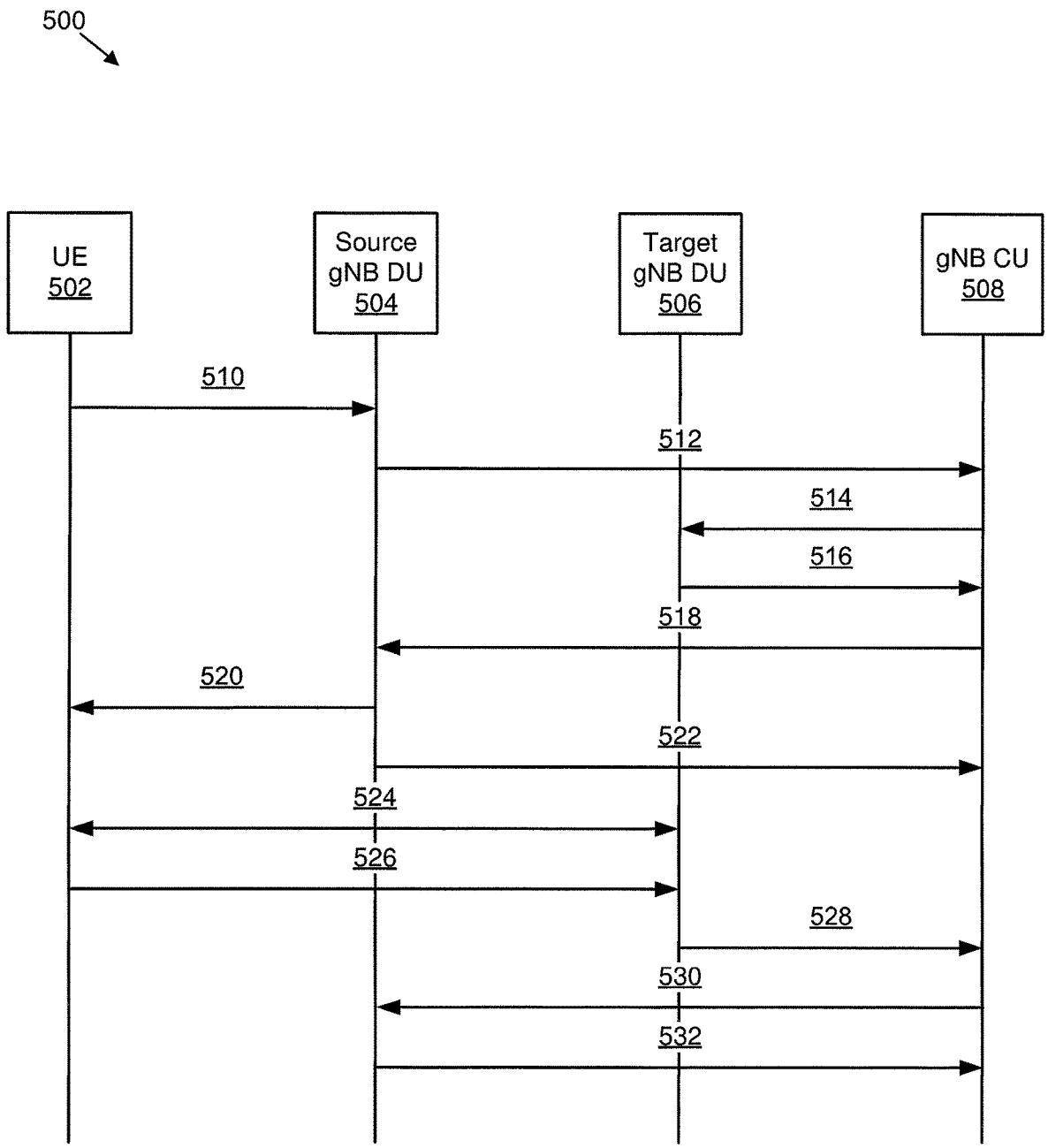
FIG. 5 is a schematic block diagram illustrating one embodiment of a mobility procedure.

FIG. 5 is a schematic block diagram illustrating one embodiment of a mobility procedure 500. A remote unit (UE 502), a source gNB DU 504, a target gNB DU 506, and a gNB CU 508 communicate as part of the mobility procedure 500. As may be appreciated, any of the communications described in this and other embodiments may include one or more messages as part of a communication.

In one embodiment, in a first communication 510 transmitted from the UE 502 to the source gNB DU 504, the UE 502 sends a measurement report message to the source gNB DU 504.

In certain embodiments, in a second communication 512 transmitted from the source gNB DU 504 to the gNB CU 508, the source gNB DU 504 sends an uplink RRC transfer message to the gNB CU 508 to convey the received measurement report from the measurement report message.

In some embodiments, in a third communication 514 transmitted from the gNB CU 508 to the target gNB DU 506, the gNB CU 508 sends a UE context setup request message to the target gNB DU 506 to create a UE context and to setup one or more bearers.

In various embodiments, in a fourth communication 516 transmitted from the target gNB DU 506 to the gNB CU 508, the target gNB DU 506 responds to the gNB CU 508 with a UE context setup response message.

In one embodiment, in a fifth communication 518 transmitted from the gNB CU 508 to the source gNB DU 504, the gNB CU 508 sends a UE context modification request message to the source gNB DU 504, which includes a generated RRCConnectionReconfiguration message and indicates to stop data transmission for the UE 502. The source gNB DU 504 may also send a downlink data delivery status frame to inform the gNB CU 508 about unsuccessfully transmitted downlink data to the UE 502.

In certain embodiments, in a sixth communication 520 transmitted from the source gNB DU 504 to the UE 502, the source gNB DU 504 forwards the received RRCConnectionReconfiguration message to the UE 502.

In some embodiments, in a seventh communication 522 transmitted from the source gNB DU 504 to the gNB CU 508, the source gNB DU 504 responds to the gNB CU 508 with a UE context modification response message. In some embodiments, the source gNB DU 504 may send a downlink data delivery status frame to inform the gNB CU 508 about downlink packets, which may include PDCP PDUs not successfully transmitted in the source gNB DU 504, sent from the gNB CU 508 to the target gNB DU 506. In some embodiments, it may be up to the gNB CU 508 implementation to determine whether to start sending DL user data to target gNB DU 506 before or after reception of the downlink data delivery status.

In various embodiments, in an eighth communication 524 transmitted between the UE 502 and the target gNB DU 506, a random access procedure may be performed.

In one embodiment, in a ninth communication 526 transmitted from the UE 502 and the target gNB DU 506, the UE 502 responds to the target gNB DU 506 with an RRCConnectionReconfigurationComplete message.

In certain embodiments, in a tenth communication 528 transmitted from the target gNB DU 506 to the gNB CU 508, the target gNB DU 506 sends an uplink RRC transfer message to the gNB CU 508 to convey the received RRCConnectionReconfigurationComplete message. In one embodiment, downlink packets may be sent to the UE 502. In various embodiments, uplink packets may be sent from the UE 502, which may also be forwarded to the gNB CU 508 through the target gNB DU 506.

In some embodiments, in an eleventh communication 530 transmitted from the gNB CU 508 to the source gNB DU 504, the gNB CU 508 sends a UE context release command message to the source gNB DU 504.

In various embodiments, in a twelfth communication 532 transmitted from the source gNB DU 504 to the gNB CU 508, the source gNB DU 504 releases the UE context and responds the gNB CU 508 with a UE context release complete message.

Figure 6:
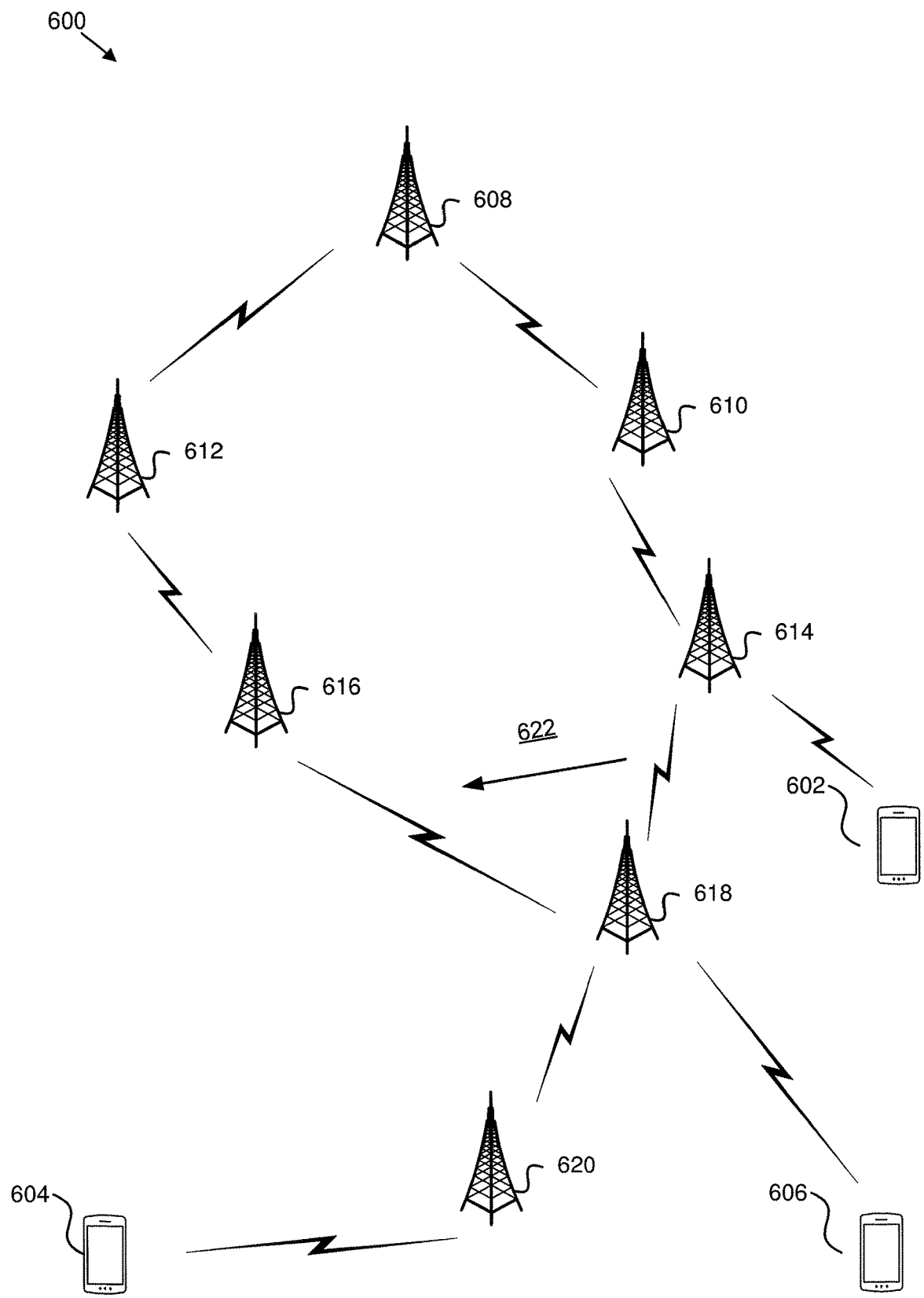
FIG. 6 is a schematic block diagram illustrating another embodiment of an integrated access backhaul system.

FIG. 6 is a schematic block diagram illustrating another embodiment of an integrated access backhaul system 600. The integrated access backhaul system 600 includes a first UE 602 ("UE1"), a second UE 604 ("UE2"), a third UE 606 ("UE3"), a gNB central unit 608 ("gNB CU"), a first gNB distributed unit 610 ("gNB DU1"), a second gNB distributed unit 612 ("gNB DU2"), a first IAB node 614 ("IAB node1"), a second IAB node 616 ("IAB node2"), a third IAB node 618 ("TAB node3"), and a fourth IAB node 620 ("IAB node4"). As illustrated, the third IAB node 618 accesses the gNB central unit 608 by connecting to the first IAB node 614. However, the gNB central unit 608 may send information that triggers the third IAB node 618 to move to the second IAB node 616 as illustrated by arrow 622.

Figure 7:
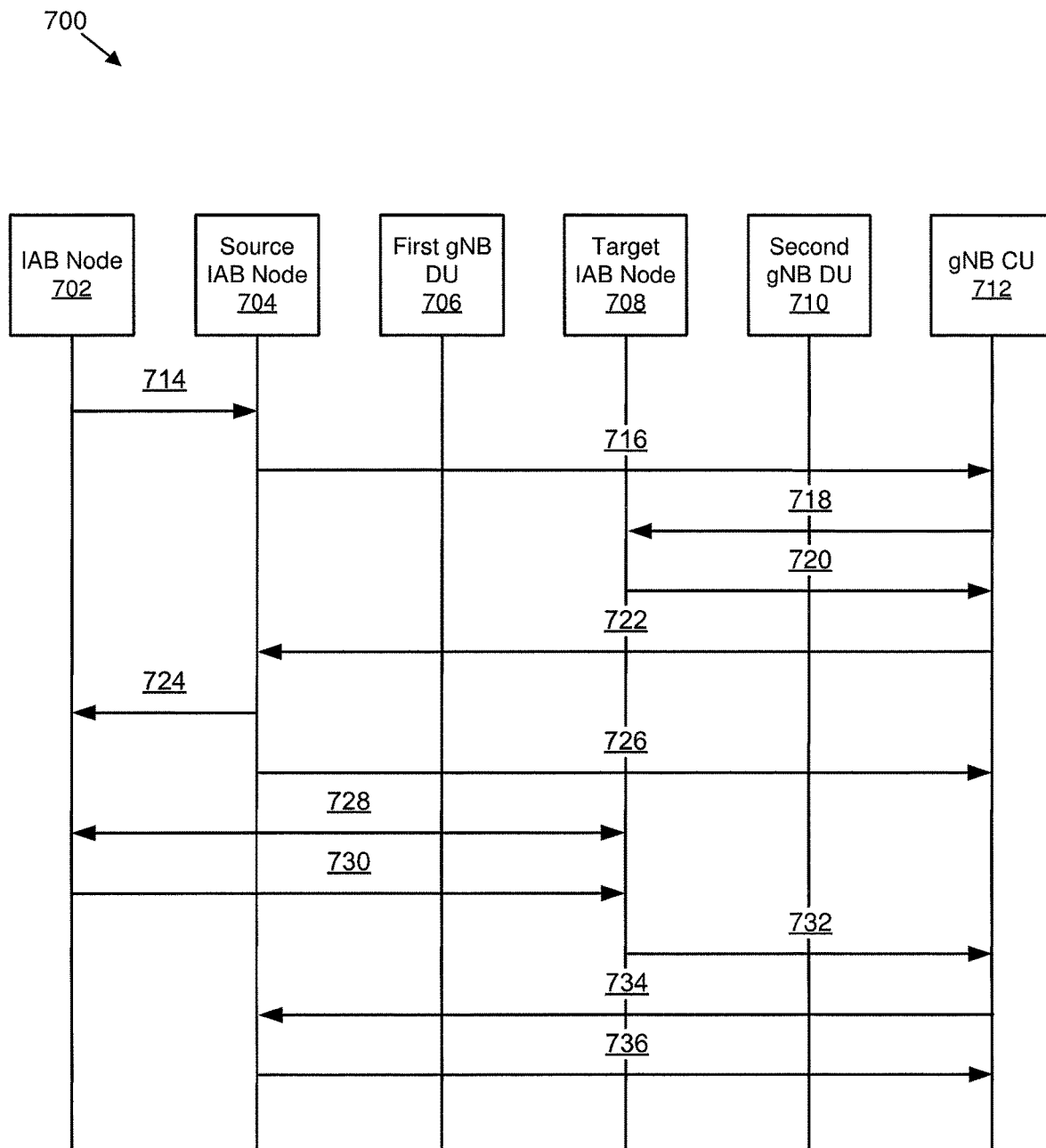
FIG. 7 is a schematic block diagram illustrating another embodiment of a mobility procedure.

FIG. 7 is a schematic block diagram illustrating another embodiment of a mobility procedure 700. An IAB node 702, a source IAB node 704, a first gNB DU 706, a target IAB node 708, a second gNB DU 710, and a gNB CU 712 communicate as part of the mobility procedure 700. The mobility procedure 700 provides one embodiment of communications that may be used to transition communication from the IAB node 702 (e.g., third IAB node 618) communicating with the source IAB node 704 (e.g., first IAB node 614) to the target IAB node 708 (e.g., second IAB node 616).

In one embodiment, in a first communication 714 transmitted from the IAB node 702 to the source IAB node 704, the IAB node 702 sends a measurement report message to the source IAB node 704.

In certain embodiments, in a second communication 716 transmitted from the source IAB node 704 to the gNB CU 712, the source IAB node 704 sends an uplink RRC transfer message to the gNB CU 712 to convey the received measurement report from the measurement report message that may be relayed by an intermediate IAB node and/or the first gNB DU 706.

In some embodiments, in a third communication 718 transmitted from the gNB CU 712 to the target IAB node 708, the gNB CU 712 sends a UE context setup request message to the target IAB node 708 to create a UE context and to setup one or more bearers. In certain embodiments, the UE context setup request message may be relayed by an intermediate IAB node and/or the second gNB DU 710. In various embodiments, the UE context setup request message may include additional information to enable the target IAB node 708 to know whether the IAB node 702 is an IAB node or a UE. In some embodiments, the additional information may include load assistance information, capacity assistance information, and/or other assistance information. In certain embodiments, the load assistance information includes a number of UEs served by the IAB node 702 and/or a number of downstream IAB nodes served by the IAB node 702. In one embodiment, the capacity assistance information may include an IAB aggregated maximum bit rate for uplink and/or an IAB aggregated maximum bit rate for downlink. An aggregated maximum bit rate may be a summation of all bit rates handled by a particular IAB node. In various embodiments, other assistance information may include an ID corresponding to the IAB node 702 and/or an ID corresponding to a DU. In some embodiments, the other assistance information may include an indication that the IAB node 702 is an IAB and not a UE. In various embodiments, the indication may be an implicit indication by including some IAB-related parameter, such as any additional information described herein. In one embodiment, the indication may be a one-bit indicator. The one-bit indicator may be equal to zero to indicate that a device is a UE, and the one-bit indicator may be equal to one to indicate that the device is an IAB node.

In various embodiments, in a fourth communication 720 transmitted from the target IAB node 708 to the gNB CU 712, the target IAB node 708 responds to the gNB CU 712 with a UE context setup response message.

In one embodiment, in a fifth communication 722 transmitted from the gNB CU 712 to the source IAB node 704, the gNB CU 712 sends a UE context modification request message to the source IAB node 704, which includes a generated RRCConnectionReconfiguration message and indicates to stop data transmission for the IAB node 702. The source IAB node 704 may also send a downlink data delivery status frame to inform the gNB CU 712 about unsuccessfully transmitted downlink data to the IAB node 702. In certain embodiments, as part of the UE context modification request message and/or the fifth communication 722, the gNB CU 712 may indicate with an indicator to an intermediate IAB node on a path between the IAB node 702 and a donor DU to stop the data transmissions for the IAB node 702. The indicator may indicate: uplink data and/or downlink data, an ID for the IAB node 702 (e.g., to stop downlink and/or uplink data routed and/or served by the IAB node 702), a set of UE IDs served by the IAB node 702 and/or downstream nodes, and/or a set of UE specific bearer IDs served by the IAB node 702 and/or downstream nodes. In some embodiments, the indicator may be configured by RRC signaling.

In various embodiments, as part of the UE context modification request message and/or the fifth communication 722, the IAB node 702 (e.g., or another node) may indicate with an indicator to upstream nodes to stop the data transmissions for the IAB node 702. In certain embodiments, the indicator may be included in an adaptative layer. Moreover, after the IAB node 702 informs its parent IAB node, the parent IAB node may further propagate the indicator to its parent IAB until all upstream nodes have received the indicator. The indicator may indicate: uplink data and/or downlink data, an ID for the IAB node 702 (e.g., to stop downlink and/or uplink data routed and/or served by the IAB node 702), a set of UE IDs served by the IAB node 702 and/or downstream nodes, and/or a set of UE specific bearer IDs served by the IAB node 702 and/or downstream nodes. In some embodiments, the indicator may be configured by RRC signaling. In one embodiment, as part of the UE context modification request message and/or the fifth communication 722, a new route table may be included to update routing information.

In certain embodiments, in a sixth communication 724 transmitted from the source IAB node 704 to the IAB node 702, the source IAB node 704 forwards the received RRC-ConnectionReconfiguration message to the IAB node 702.

In some embodiments, in a seventh communication 726 transmitted from the source IAB node 704 to the gNB CU 712, the source IAB node 704 responds to the gNB CU 712 with a UE context modification response message. In one embodiment, the seventh communication 726 may include a response to indicate that an update to a route table is complete. In some embodiments, the source IAB node 704 may send a downlink data delivery status frame to inform the gNB CU 712 about downlink packets, which may include PDCP PDUs not successfully transmitted in the source IAB node 704, sent from the gNB CU 712 to the target IAB node 708. In some embodiments, it may be up to the gNB CU 712 implementation to determine whether to start sending DL user data to target IAB node 708 before or after reception of the downlink data delivery status.

In various embodiments, in an eighth communication 728 transmitted between the IAB node 702 and the target IAB node 708, a random access procedure may be performed.

In one embodiment, in a ninth communication 730 transmitted from the IAB node 702 and the target IAB node 708, the IAB node 702 responds to the target IAB node 708 with an RRCConnectionReconfigurationComplete message.

In certain embodiments, in a tenth communication 732 transmitted from the target IAB node 708 to the gNB CU 712, the target IAB node 708 sends an uplink RRC transfer message to the gNB CU 712 to convey the received RRC-ConnectionReconfigurationComplete message. In one embodiment, downlink packets may be sent to the IAB node 702. In various embodiments, uplink packets may be sent from the IAB node 702, which may also be forwarded to the gNB CU 712 through an intermediate IAB node and/or the target IAB node 708.

In some embodiments, in an eleventh communication 734 transmitted from the gNB CU 712 to the source IAB node 704, the gNB CU 712 sends a UE context release command message to the source IAB node 704.

In various embodiments, in a twelfth communication 736 transmitted from the source IAB node 704 to the gNB CU 712, the source IAB node 704 releases the UE context and responds the gNB CU 712 with a UE context release complete message.

Figure 8:
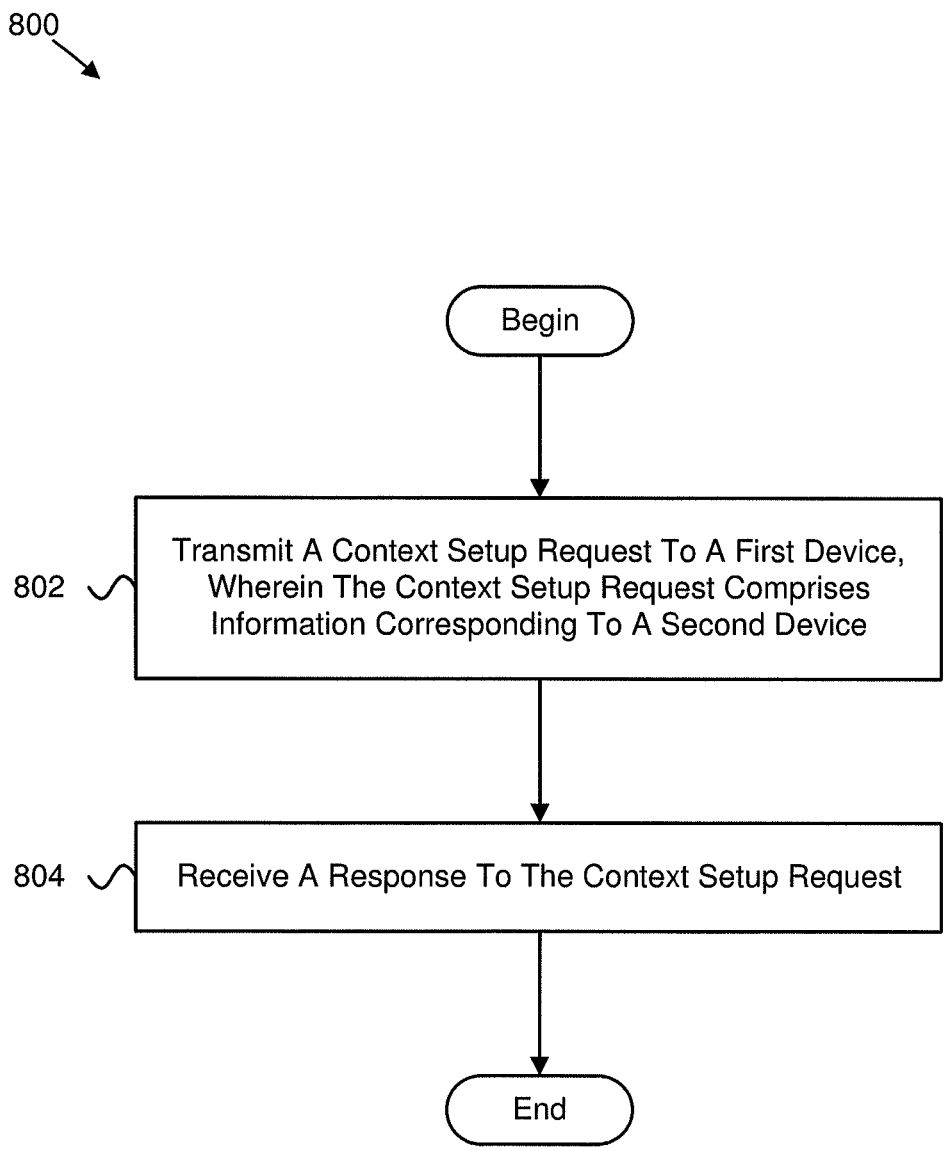
FIG. 8 is a schematic flow chart diagram illustrating one embodiment of a method for transmitting device information in a context setup request.

FIG. 8 is a schematic flow chart diagram illustrating one embodiment of a method 800 for transmitting device information in a context setup request. In some embodiments, the method 800 is performed by an apparatus, such as the network unit 104 (e.g., IAB node). In certain embodiments, the method 800 may be performed by a processor executing program code, for example, a microcontroller, a microprocessor, a CPU, a GPU, an auxiliary processing unit, a FPGA, or the like.

The method 800 may include transmitting 802 a context setup request to a first device. In such an embodiment, the context setup request includes information corresponding to a second device. In certain embodiments, the method 800 includes receiving 804 a response to the context setup request.

In certain embodiments, the information comprises a number of user devices served by the second device, a number of nodes served by the second device, or a combination thereof. In some embodiments, the information comprises a maximum aggregated bit rate for downlink, a maximum aggregated bit rate for uplink, or a combination thereof. In various embodiments, the information comprises a backhaul node identifier, a distributed unit identifier, or a combination thereof corresponding to the second device.

In one embodiment, the information comprises a one-bit indicator. In certain embodiments, the one-bit indicator is equal to zero if the second device is a user device, and the one-bit indicator is equal to one if the second device is a backhaul node. In some embodiments, the information corresponds to a backhaul node and indicates to the first device that the second device is the backhaul node.

Figure 9:
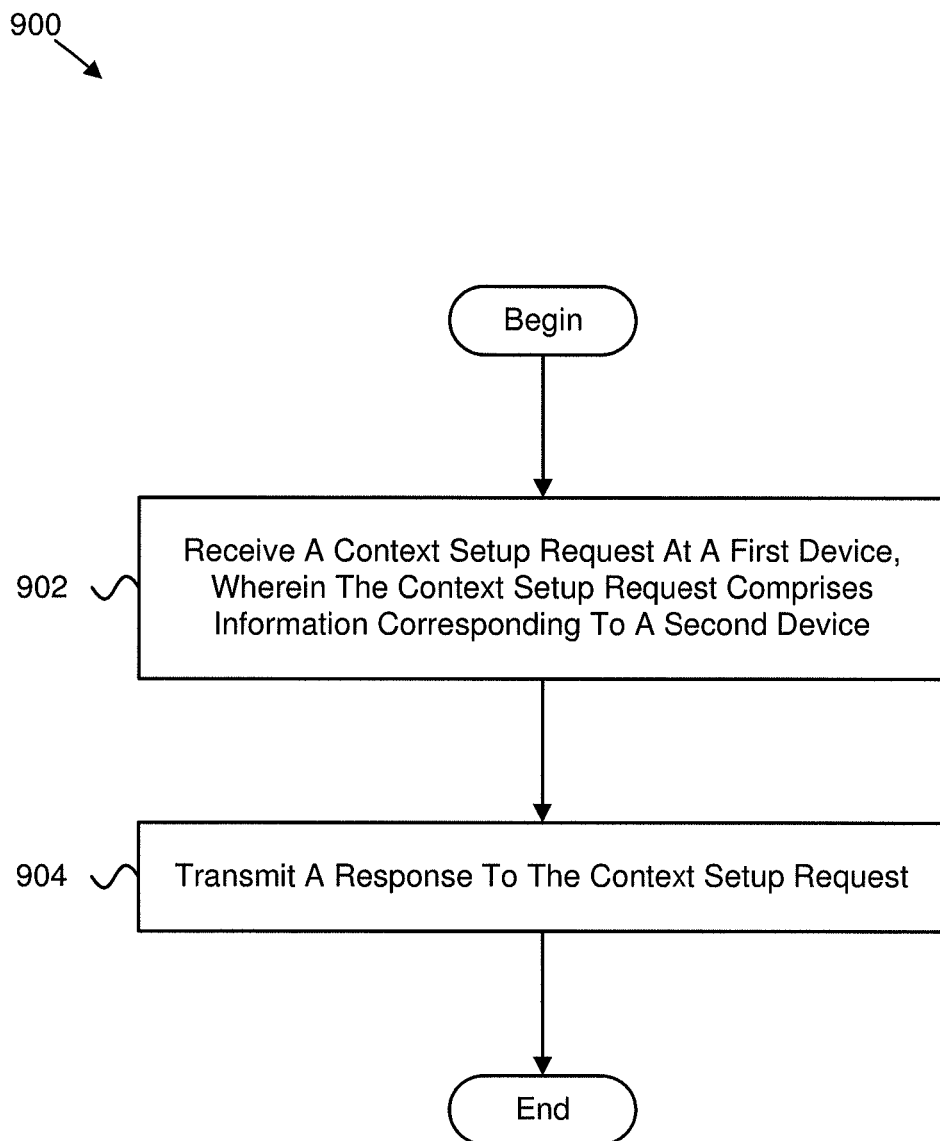
FIG. 9 is a schematic flow chart diagram illustrating one embodiment of a method for receiving device information in a context setup request.

FIG. 9 is a schematic flow chart diagram illustrating one embodiment of a method 900 for receiving device information in a context setup request. In some embodiments, the method 900 is performed by an apparatus, such as the network unit 104 (e.g., IAB node). In certain embodiments, the method 900 may be performed by a processor executing program code, for example, a microcontroller, a microprocessor, a CPU, a GPU, an auxiliary processing unit, a FPGA, or the like.

The method 900 may include receiving 902 a context setup request at a first device. In such an embodiment, the context setup request includes information corresponding to a second device. In some embodiments, the method 900 includes transmitting 904 a response to the context setup request.

In certain embodiments, the information comprises a number of user devices served by the second device, a number of nodes served by the second device, or a combination thereof. In some embodiments, the information comprises a maximum aggregated bit rate for downlink, a maximum aggregated bit rate for uplink, or a combination thereof. In various embodiments, the information comprises a backhaul node identifier, a distributed unit identifier, or a combination thereof corresponding to the second device.

In one embodiment, the information comprises a one-bit indicator. In certain embodiments, the one-bit indicator is equal to zero if the second device is a user device, and the one-bit indicator is equal to one if the second device is a backhaul node. In some embodiments, the information corresponds to a backhaul node and indicates to the first device that the second device is the backhaul node.

Figure 10:
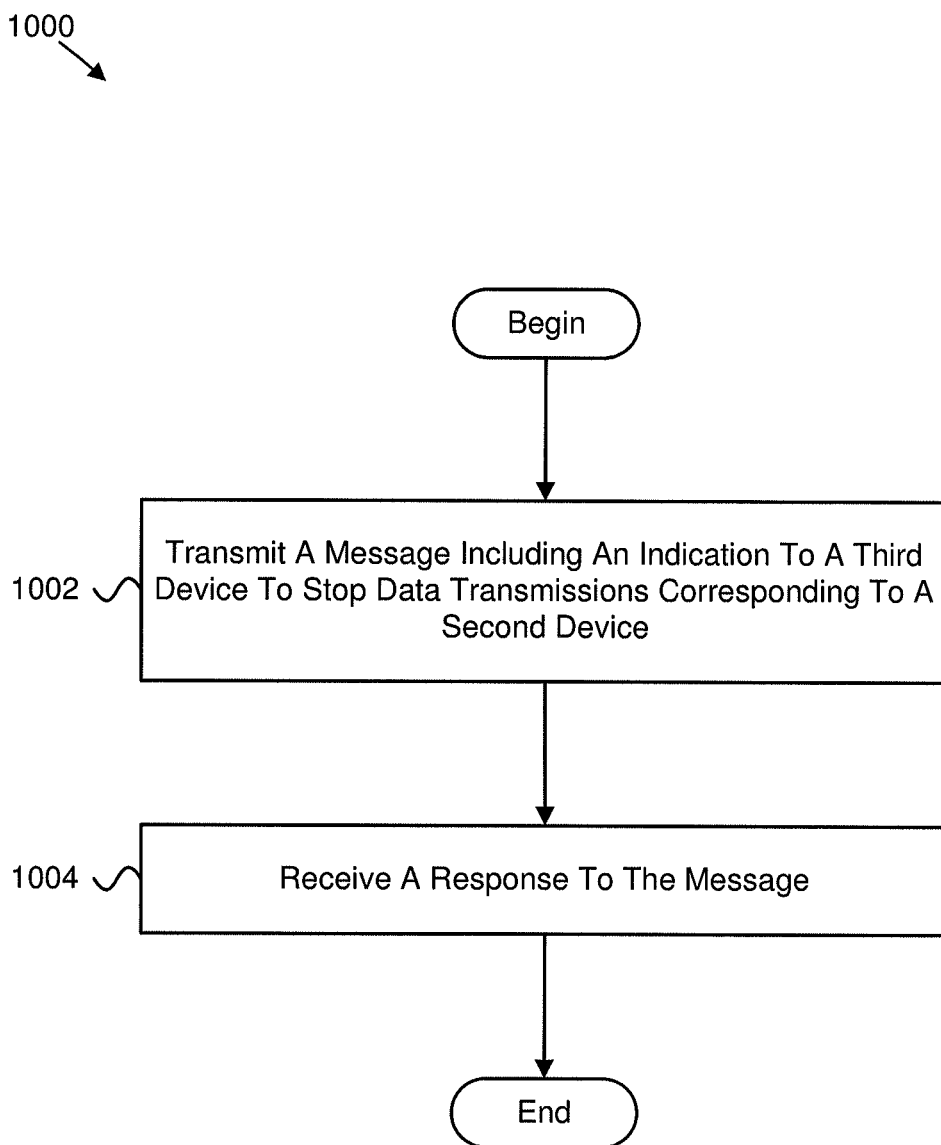
FIG. 10 is a schematic flow chart diagram illustrating one embodiment of a method for transmitting a message indicating to stop data transmissions.

FIG. 10 is a schematic flow chart diagram illustrating one embodiment of a method 1000 for transmitting a message indicating to stop data transmissions. In some embodiments, the method 1000 is performed by an apparatus, such as the network unit 104 (e.g., IAB node). In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002 a message including an indication to a third device to stop data transmissions corresponding to a second device. In certain embodiments, the method 1000 includes receiving 1004 a response to the message.

In certain embodiments, the data transmissions comprise uplink data, downlink data, or a combination thereof. In some embodiments, the indication comprises an identifier corresponding to the second device, and the data transmissions served by the second device are stopped based on the indication. In various embodiments, the indication comprises a set of user device identifiers, and the data transmissions corresponding to the set of user device identifiers are stopped based on the indication.

In one embodiment, the indication comprises a set of user device specific bearer identifiers, and the data transmissions corresponding to the set of user device specific bearer identifiers are stopped based on the indication. In certain embodiments, the indication is configured by radio resource control signaling. In some embodiments, the indication is included in an adaptative layer.

In various embodiments, the third device comprises an intermediate node, a parent node, or a combination thereof. In one embodiment, the message is transmitted from a central unit. In certain embodiments, the message is transmitted from an access backhaul node, a child backhaul node, or a combination thereof.

Figure 11:
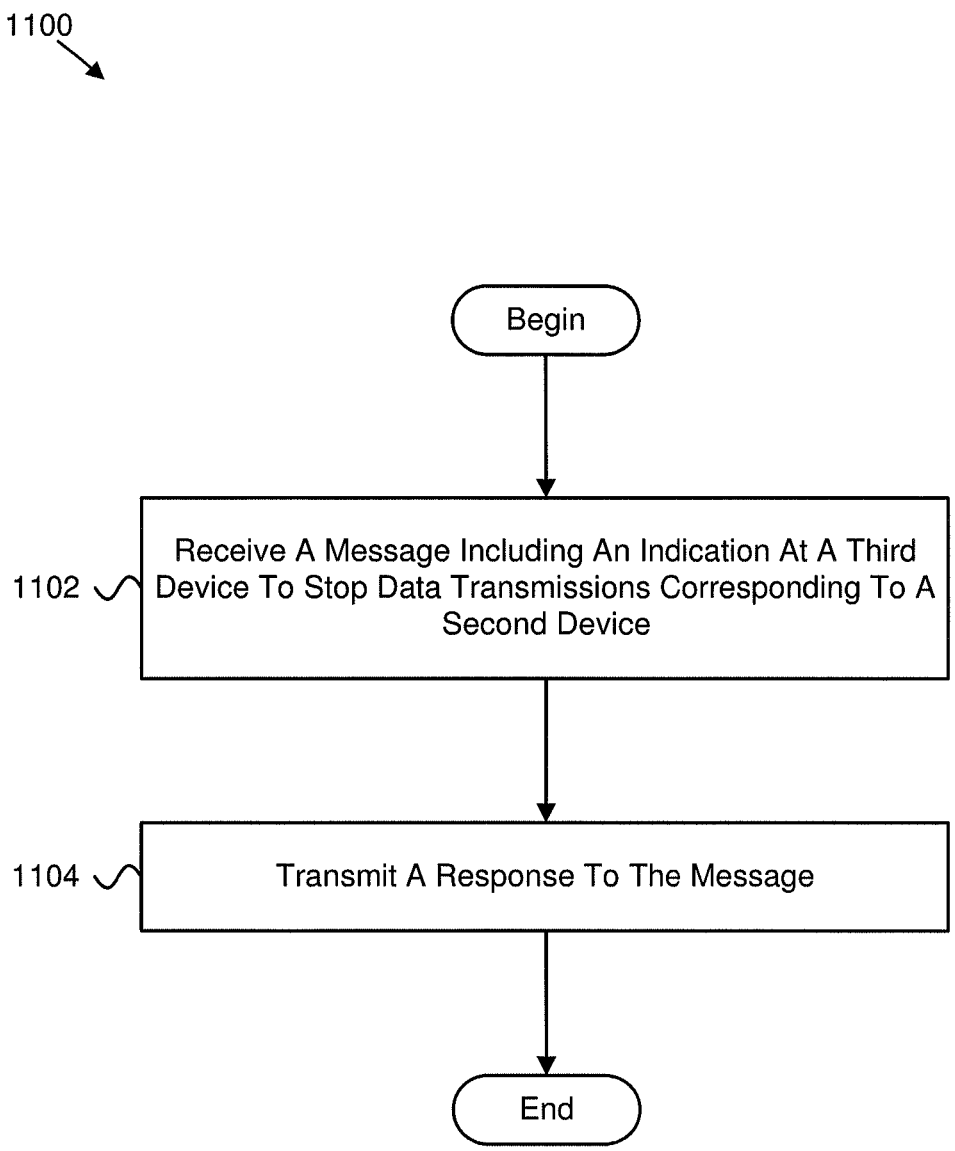
FIG. 11 is a schematic flow chart diagram illustrating one embodiment of a method for receiving a message indicating to stop data transmissions.

FIG. 11 is a schematic flow chart diagram illustrating one embodiment of a method 1100 for receiving a message indicating to stop data transmissions. In some embodiments, the method 1100 is performed by an apparatus, such as the network unit 104 (e.g., IAB node). In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102 a message including an indication at a third device to stop data transmissions corresponding to a second device. In some embodiments, the method 1100 includes transmitting 1104 a response to the message.

In certain embodiments, the data transmissions comprise uplink data, downlink data, or a combination thereof. In some embodiments, the indication comprises an identifier corresponding to the second device, and the data transmissions served by the second device are stopped based on the indication. In various embodiments, the indication comprises a set of user device identifiers, and the data transmissions corresponding to the set of user device identifiers are stopped based on the indication.

In one embodiment, the indication comprises a set of user device specific bearer identifiers, and the data transmissions corresponding to the set of user device specific bearer identifiers are stopped based on the indication. In certain embodiments, the indication is configured by radio resource control signaling. In some embodiments, the indication is included in an adaptative layer.

In various embodiments, the third device comprises an intermediate node, a parent node, or a combination thereof. In one embodiment, the message is transmitted from a central unit. In certain embodiments, the message is transmitted from an access backhaul node, a child backhaul node, or a combination thereof.

In one embodiment, a method comprises: transmitting a context setup request to a first device, wherein the context setup request comprises information corresponding to a second device; and receiving a response to the context setup request.

In certain embodiments, the information comprises a number of user devices served by the second device, a number of nodes served by the second device, or a combination thereof.

In some embodiments, the information comprises a maximum aggregated bit rate for downlink, a maximum aggregated bit rate for uplink, or a combination thereof.

In various embodiments, the information comprises a backhaul node identifier, a distributed unit identifier, or a combination thereof corresponding to the second device.

In one embodiment, the information comprises a one-bit indicator.

In certain embodiments, the one-bit indicator is equal to zero if the second device is a user device, and the one-bit indicator is equal to one if the second device is a backhaul node.

In some embodiments, the information corresponds to a backhaul node and indicates to the first device that the second device is the backhaul node.

In one embodiment, an apparatus comprises: a transmitter that transmits a context setup request to a first device, wherein the context setup request comprises information corresponding to a second device; and a receiver that receives a response to the context setup request.

In certain embodiments, the information comprises a number of user devices served by the second device, a number of nodes served by the second device, or a combination thereof.

In some embodiments, the information comprises a maximum aggregated bit rate for downlink, a maximum aggregated bit rate for uplink, or a combination thereof.

In various embodiments, the information comprises a backhaul node identifier, a distributed unit identifier, or a combination thereof corresponding to the second device.

In one embodiment, the information comprises a one-bit indicator.

In certain embodiments, the one-bit indicator is equal to zero if the second device is a user device, and the one-bit indicator is equal to one if the second device is a backhaul node.

In some embodiments, the information corresponds to a backhaul node and indicates to the first device that the second device is the backhaul node.

In one embodiment, a method comprises: receiving a context setup request at a first device, wherein the context setup request comprises information corresponding to a second device; and transmitting a response to the context setup request.

In certain embodiments, the information comprises a number of user devices served by the second device, a number of nodes served by the second device, or a combination thereof.

In some embodiments, the information comprises a maximum aggregated bit rate for downlink, a maximum aggregated bit rate for uplink, or a combination thereof.

In various embodiments, the information comprises a backhaul node identifier, a distributed unit identifier, or a combination thereof corresponding to the second device.

In one embodiment, the information comprises a one-bit indicator.

In certain embodiments, the one-bit indicator is equal to zero if the second device is a user device, and the one-bit indicator is equal to one if the second device is a backhaul node.

In some embodiments, the information corresponds to a backhaul node and indicates to the first device that the second device is the backhaul node.

In one embodiment, an apparatus comprises: a receiver that receives a context setup request at a first device, wherein the context setup request comprises information corresponding to a second device; and a transmitter that transmits a response to the context setup request.

In certain embodiments, the information comprises a number of user devices served by the second device, a number of nodes served by the second device, or a combination thereof.

In some embodiments, the information comprises a maximum aggregated bit rate for downlink, a maximum aggregated bit rate for uplink, or a combination thereof.

In various embodiments, the information comprises a backhaul node identifier, a distributed unit identifier, or a combination thereof corresponding to the second device.

In one embodiment, the information comprises a one-bit indicator.

In certain embodiments, the one-bit indicator is equal to zero if the second device is a user device, and the one-bit indicator is equal to one if the second device is a backhaul node.

In some embodiments, the information corresponds to a backhaul node and indicates to the first device that the second device is the backhaul node.

In one embodiment, a method comprises: transmitting a message comprising an indication to a third device to stop data transmissions corresponding to a second device; and receiving a response to the message.

In certain embodiments, the data transmissions comprise uplink data, downlink data, or a combination thereof.

In some embodiments, the indication comprises an identifier corresponding to the second device, and the data transmissions served by the second device are stopped based on the indication.

In various embodiments, the indication comprises a set of user device identifiers, and the data transmissions corresponding to the set of user device identifiers are stopped based on the indication.

In one embodiment, the indication comprises a set of user device specific bearer identifiers, and the data transmissions corresponding to the set of user device specific bearer identifiers are stopped based on the indication.

In certain embodiments, the indication is configured by radio resource control signaling.

In some embodiments, the indication is included in an adaptative layer.

In various embodiments, the third device comprises an intermediate node, a parent node, or a combination thereof.

In one embodiment, the message is transmitted from a central unit.

In certain embodiments, the message is transmitted from an access backhaul node, a child backhaul node, or a combination thereof.

In one embodiment, an apparatus comprises: a transmitter that transmits a message comprising an indication to a third device to stop data transmissions corresponding to a second device; and a receiver that receives a response to the message.

In certain embodiments, the data transmissions comprise uplink data, downlink data, or a combination thereof.

In some embodiments, the indication comprises an identifier corresponding to the second device, and the data transmissions served by the second device are stopped based on the indication.

In various embodiments, the indication comprises a set of user device identifiers, and the data transmissions corresponding to the set of user device identifiers are stopped based on the indication.

In one embodiment, the indication comprises a set of user device specific bearer identifiers, and the data transmissions corresponding to the set of user device specific bearer identifiers are stopped based on the indication.

In certain embodiments, the indication is configured by radio resource control signaling.

In some embodiments, the indication is included in an adaptative layer.

In various embodiments, the third device comprises an intermediate node, a parent node, or a combination thereof.

In one embodiment, the message is transmitted from a central unit.

In certain embodiments, the message is transmitted from an access backhaul node, a child backhaul node, or a combination thereof.

In one embodiment, a method comprises: receiving a message comprising an indication at a third device to stop data transmissions corresponding to a second device; and transmitting a response to the message.

In certain embodiments, the data transmissions comprise uplink data, downlink data, or a combination thereof.

In some embodiments, the indication comprises an identifier corresponding to the second device, and the data transmissions served by the second device are stopped based on the indication.

In various embodiments, the indication comprises a set of user device identifiers, and the data transmissions corresponding to the set of user device identifiers are stopped based on the indication.

In one embodiment, the indication comprises a set of user device specific bearer identifiers, and the data transmissions corresponding to the set of user device specific bearer identifiers are stopped based on the indication.

In certain embodiments, the indication is configured by radio resource control signaling.

In some embodiments, the indication is included in an adaptative layer.

In various embodiments, the third device comprises an intermediate node, a parent node, or a combination thereof.

In one embodiment, the message is transmitted from a central unit.

In certain embodiments, the message is transmitted from an access backhaul node, a child backhaul node, or a combination thereof.

In one embodiment, an apparatus comprises: a receiver that receives a message comprising an indication at a third device to stop data transmissions corresponding to a second device; and a transmitter that transmits a response to the message.

In certain embodiments, the data transmissions comprise uplink data, downlink data, or a combination thereof.

In some embodiments, the indication comprises an identifier corresponding to the second device, and the data transmissions served by the second device are stopped based on the indication.

In various embodiments, the indication comprises a set of user device identifiers, and the data transmissions corresponding to the set of user device identifiers are stopped based on the indication.

In one embodiment, the indication comprises a set of user device specific bearer identifiers, and the data transmissions corresponding to the set of user device specific bearer identifiers are stopped based on the indication.

In certain embodiments, the indication is configured by radio resource control signaling.

In some embodiments, the indication is included in an adaptative layer.

In various embodiments, the third device comprises an intermediate node, a parent node, or a combination thereof.

In one embodiment, the message is transmitted from a central unit.

In certain embodiments, the message is transmitted from an access backhaul node, a child backhaul node, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a central unit (CU) of a base station in an integrated access and backhaul (IAB) system, the method comprising: transmitting a user equipment (UE) context setup request to a first IAB node, wherein the UE context setup request comprises information corresponding to a second IAB node, the information is used to assist in switching between the first IAB node and the second IAB node, the information comprises a one-bit indicator, and the one-bit indicator is equal to zero if the second IAB node is a user device, and the one-bit indicator is equal to one if the second IAB node is a backhaul node; and receiving, from the second IAB node, a response to the UE context setup request.

2. The method of claim 1, wherein the information comprises a number of user devices served by the second IAB node, a number of nodes served by the second IAB node, or a combination thereof.

3. The method of claim 1, wherein the information comprises a maximum aggregated bit rate for downlink, a maximum aggregated bit rate for uplink, or a combination thereof.

4. The method of claim 1, wherein the information comprises a backhaul node identifier, a distributed unit identifier, or a combination thereof corresponding to the second IAB node.

5. The method of claim 1, wherein the information corresponds to a backhaul node and indicates to the first IAB node that the second IAB node is the backhaul node.

6. A central unit (CU) of a base station in an integrated access and backhaul (IAB) system, the CU comprising: at least one memory; and at least one processor coupled with the at least one memory and configured to cause the CU to:transmit a user equipment (UE) context setup request to a first IAB node, wherein the UE context setup request comprises information corresponding to a second IAB node, the information is used to assist in switching between the first IAB node and the second IAB node, the information comprises a one-bit indicator, and the one-bit indicator is equal to zero if the second IAB node is a user device, and the one-bit indicator is equal to one if the second IAB node is a backhaul node; and receive, from the second IAB node, a response to the UE context setup request.

7. The CU of claim 6, wherein the information comprises a number of user devices served by the second IAB node, a number of nodes served by the second IAB node, or a combination thereof.

8. The CU of claim 6, wherein the information comprises a maximum aggregated bit rate for downlink, a maximum aggregated bit rate for uplink, or a combination thereof.

9. The CU of claim 6, wherein the information comprises a backhaul node identifier, a distributed unit identifier, or a combination thereof corresponding to the second IAB node.

10. A method performed by a first integrated access and backhaul (IAB) node in an IAB system, the method comprising: receiving a user equipment (UE) context setup request from a central unit (CU) of a base station, wherein the UE context setup request comprises information corresponding to a second IAB node, the information is used to assist in switching between the first IAB node and the second IAB node, the information comprises a one-bit indicator, and the one-bit indicator is equal to zero if the second IAB node is a user device, and the one-bit indicator is equal to one if the second IAB node is a backhaul node; and transmitting a response to the UE context setup request.

11. The method of claim 10, wherein the information comprises a number of user devices served by the second IAB node, a number of nodes served by the second IAB node, or a combination thereof.

12. The method of claim 10, wherein the information comprises a maximum aggregated bit rate for downlink, a maximum aggregated bit rate for uplink, or a combination thereof.

13. The method of claim 10, wherein the information comprises a backhaul node identifier, a distributed unit identifier, or a combination thereof corresponding to the second IAB node.

14. A first integrated access and backhaul (IAB) node in an IAB system, the first IAB node comprising: at least one memory; and at least one processor coupled with the at least one memory and configured to cause the first IAB node to: receive a user equipment (UE) context setup request from a central unit (CU) of a base station, wherein the UE context setup request comprises information corresponding to a second IAB node, the information is used to assist in switching between the first IAB node and the second IAB node, the information comprises a one-bit indicator, and the one-bit indicator is equal to zero if the second IAB node is a user device, and the one-bit indicator is equal to one if the second IAB node is a backhaul node; and transmit a response to the UE context setup request.

* * * * *